United States Patent
Pinto, IV et al.

(10) Patent No.: US 10,501,064 B2
(45) Date of Patent: Dec. 10, 2019

(54) METHOD AND APPARATUS FOR MONITORING A VEHICLE BRAKE

(71) Applicant: GM GLOBAL TECHNOLOGY OPERATIONS LLC, Detroit, MI (US)

(72) Inventors: Nicholas W. Pinto, IV, Shelby Township, MI (US); Kausalya Singuru, Troy, MI (US); Xiaoyu Huang, Troy, MI (US)

(73) Assignee: GM Global Technology Operations LLC, Deroit, MI (US)

( * ) Notice: Subject to any disclaimer, the term of this patent is extended or adjusted under 35 U.S.C. 154(b) by 207 days.

(21) Appl. No.: 15/836,226

(22) Filed: Dec. 8, 2017

(65) Prior Publication Data

US 2019/0176794 A1    Jun. 13, 2019

(51) Int. Cl.
  *B60T 17/22* (2006.01)
  *B60T 7/18* (2006.01)
  *B60T 7/22* (2006.01)

(52) U.S. Cl.
  CPC ............ *B60T 17/22* (2013.01); *B60T 7/18* (2013.01); *B60T 7/22* (2013.01); *B60T 2201/022* (2013.01); *B60T 2250/04* (2013.01); *B60T 2270/88* (2013.01)

(58) Field of Classification Search
  CPC ... B60T 17/22; B60T 7/18; B60T 7/22; B60T 2201/022; B60T 2270/88
  USPC ...................................................... 701/29.2
  See application file for complete search history.

(56) References Cited

U.S. PATENT DOCUMENTS

| | | | | |
|---|---|---|---|---|
| 6,523,912 B1* | 2/2003 | Bond, III | ............... | B60R 21/013 303/9 |
| 8,078,375 B2* | 12/2011 | Steph | ................. | B60T 17/18 188/1.11 E |
| 8,204,668 B2* | 6/2012 | Greene | ................. | B60T 17/22 340/479 |
| 8,717,159 B2* | 5/2014 | Todd | ................. | B60T 17/221 340/454 |
| 2015/0100190 A1* | 4/2015 | Yopp | ................. | B60T 7/18 701/23 |
| 2016/0163130 A1* | 6/2016 | Zagajac | ............... | G07C 5/0808 701/29.1 |
| 2016/0264120 A1* | 9/2016 | Kellner | ................. | B60T 17/228 |
| 2017/0008335 A1* | 1/2017 | Howard | ................. | B60B 15/10 |
| 2019/0176794 A1* | 6/2019 | Pinto, IV | ............... | B60T 17/22 |

* cited by examiner

*Primary Examiner* — Thomas G Black
*Assistant Examiner* — Wae L Louie
(74) *Attorney, Agent, or Firm* — Quinn IP Law

(57) ABSTRACT

A braking system for a vehicle includes devices that are configured to apply braking force to a wheel in response to a braking command. A first sensor is disposed to monitor a parameter associated with the braking force, and a spatial sensor is disposed to determine a linear range between the vehicle and a predefined locus point. A controller is operatively connected to the braking system and in communication with the first sensor and the spatial sensor. The controller detects a braking event and determines a time to stop and an applied braking force during the braking event, which is integrated over the time to stop. The braking system is evaluated based upon the total stopping distance and the integrated applied braking force during the braking event. A fault associated with the braking system is determined based upon the evaluation of the braking system.

19 Claims, 2 Drawing Sheets

METHOD AND APPARATUS FOR MONITORING A VEHICLE BRAKE

INTRODUCTION

Vehicles can include on-board monitoring systems to monitor and identify a need for service and/or maintenance of a system.

SUMMARY

A braking system for a vehicle is described, and includes devices that are configured to apply braking force to a wheel in response to a braking command. A first sensor is disposed to monitor a parameter associated with the braking force, and a spatial sensor is disposed to determine a linear range between the vehicle and a predefined locus point. A controller is operatively connected to the braking system and in communication with the first sensor and the spatial sensor. The controller includes an instruction set that is executable to detect a braking event and determine an applied braking force during the braking event, which can be integrated over a time to stop. A total stopping distance during the braking event is monitored, and the braking system is evaluated based upon the total stopping distance, the time to stop and the integrated applied braking force during the braking event. A fault associated with the braking system is determined based upon the evaluation of the braking system and communicated via a controller.

An aspect of the disclosure includes determining a state of health (SOH) for the braking system based upon the evaluation of the total stopping distance, the time to stop and the integrated applied braking force during the braking event, and communicating, via a human-machine interface device, the SOH for the braking system to a vehicle operator when the SOH is less than a threshold SOH.

Another aspect of the disclosure includes determining a state of health (SOH) for the braking system based upon the evaluation of the total stopping distance, the time to stop and the integrated applied braking force during the braking event and communicating, via a telematics device, the SOH for the braking system to an off-board controller when the SOH is less than a threshold SOH.

Another aspect of the disclosure includes determining an adjustment to the applied braking force during a subsequent braking event based upon the total stopping distance and the integrated applied braking force during the braking event.

Another aspect of the disclosure includes determining an initial vehicle speed at initiation of the braking event, and evaluating, via the controller, the braking system based upon the initial vehicle speed, the total stopping distance and the integrated applied braking force during the braking event.

Another aspect of the disclosure includes the on-vehicle sensor monitoring the total stopping distance during the braking event being one of a lidar device, a radar device, a global positioning system or an ultrasonic device.

Another aspect of the disclosure includes the sensor monitoring the applied braking force during the braking event being a pressure sensor disposed to monitor hydraulic braking pressure in a master cylinder of the braking system.

Another aspect of the disclosure includes the sensor monitoring the applied braking force during the braking event being a sensor disposed to monitor displacement of a brake piston of the braking system.

Another aspect of the disclosure includes communicating, via a telematics device, the need to service the braking system to an off-board controller.

Another aspect of the disclosure includes evaluating the braking system based upon the total stopping distance, the time to stop and the integrated applied braking force during the braking event, including determining a mean deceleration rate based upon the total stopping distance, and evaluating the braking system based upon a relation between the integrated applied braking force and the mean deceleration rate.

The above features and advantages, and other features and advantages, of the present teachings are readily apparent from the following detailed description of some of the best modes and other embodiments for carrying out the present teachings, as defined in the appended claims, when taken in connection with the accompanying drawings.

BRIEF DESCRIPTION OF THE DRAWINGS

One or more embodiments will now be described, by way of example, with reference to the accompanying drawings, in which.

It should be understood that the appended drawings are not necessarily to scale, and present a somewhat simplified representation of various preferred features of the present disclosure as disclosed herein, including, for example, specific dimensions, orientations, locations, and shapes. Details associated with such features will be determined in part by the particular intended application and use environment.

DETAILED DESCRIPTION

The components of the disclosed embodiments, as described and illustrated herein, may be arranged and designed in various configurations. Thus, the following detailed description is not intended to limit the scope of the disclosure, as claimed, but is merely representative of possible embodiments thereof. In addition, while numerous specific details are set forth in the following description in order to provide a thorough understanding of the embodiments disclosed herein, some embodiments can be practiced without some of these details. Moreover, for the purpose of clarity, technical material that is understood in the related art has not been described in detail in order to avoid unnecessarily obscuring the disclosure. Furthermore, the disclosure, as illustrated and described herein, may be practiced in the absence of an element that is not specifically disclosed herein.

Figure 1:
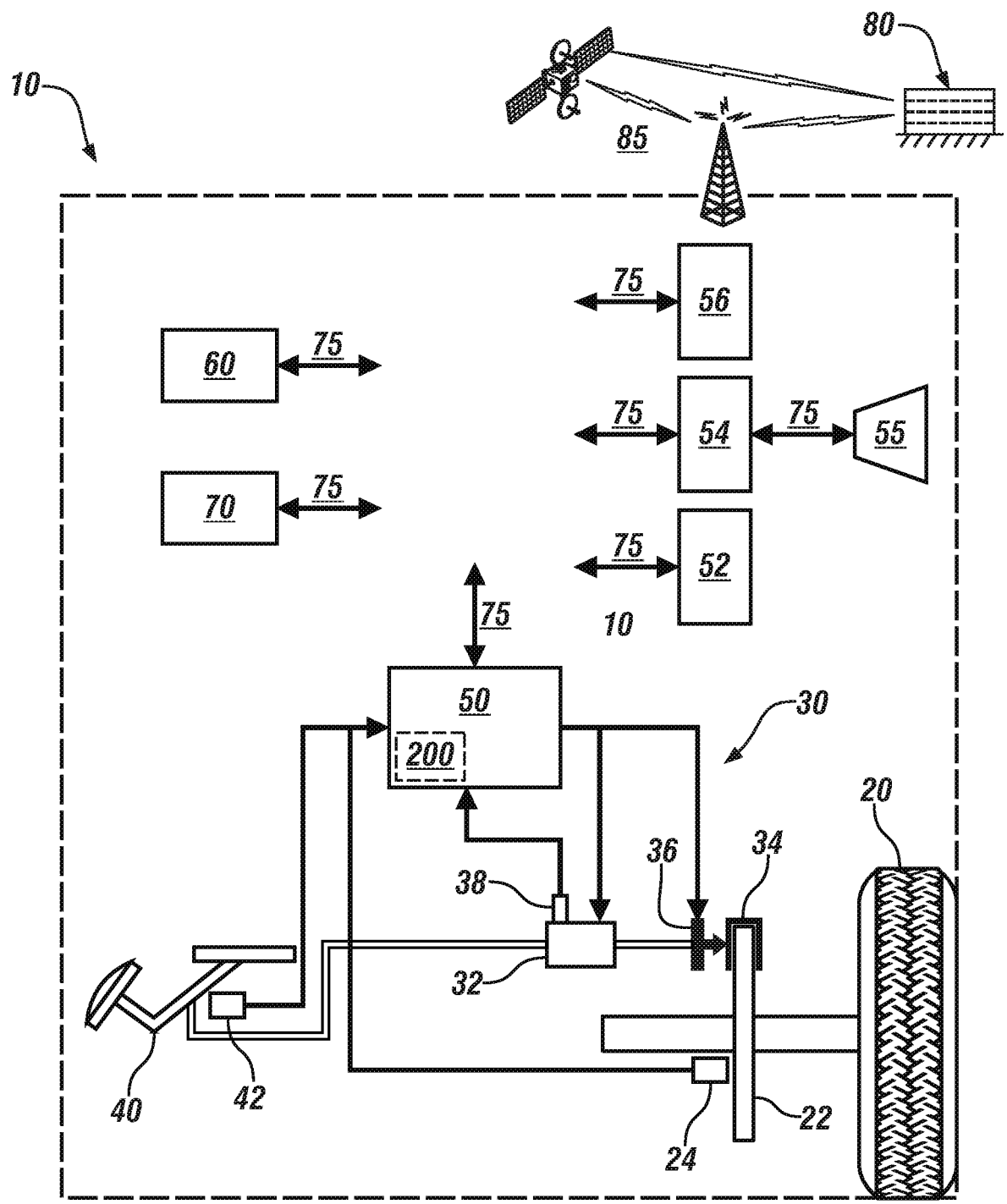
FIG. 1 schematically shows a portion of a vehicle including a vehicle braking system and associated controllers, in accordance with the disclosure.

Referring to the drawings, wherein like reference numerals correspond to like or similar components throughout the several Figures, FIG. 1, consistent with embodiments disclosed herein, illustrates a portion of a vehicle 10 that includes an braking system 30 disposed to exert braking force on a vehicle wheel 20 and an associated braking controller 50 that is illustrative of the concepts described herein. The vehicle 10 may be equipped with an autonomous controller 60 that implements autonomous vehicle functionalities in one embodiment. The vehicle 10 includes, in one embodiment, a four-wheel passenger vehicle with steerable front wheels and fixed rear wheels. The vehicle 10 may include, by way of non-limiting examples, a passenger vehicle, a light-duty or heavy-duty truck, a utility vehicle, an agricultural vehicle, an industrial/warehouse vehicle, or a recreational off-road vehicle.

The vehicle wheel 20 is mounted on an axle portion that includes a rotatable disc 22, and a wheel speed sensor 24 that is disposed to monitor rotational position and speed of the disc 22 and thus the wheel 20. The braking system 30 includes, in one embodiment, a brake caliper 34, a brake actuator 36 and a master cylinder 32 that work in concert to generate hydraulic pressure to apply braking force to the disc 22 to effect wheel braking during a braking event. A pressure sensor 38 is disposed to monitor the hydraulic pressure and the associated applied braking pressure in the master cylinder 32. Braking pressure is one metric associated with applied braking force that may be captured during a braking event. Other metrics related to braking force may be employed and fall within the scope of this disclosure. Alternatively or in addition, other braking system configurations may be disposed to apply braking force to the vehicle wheel 20, such as drum brake configurations. Alternatively, another braking system configuration may include electrically-actuated caliper devices that include an electrically-activated brake piston and a linear sensor that is disposed to monitor linear displacement, i.e., stroke length of a plunger of the brake piston. Furthermore, braking force can originate from an electric machine, such as an electric wheel motor or an electric motor/generator that is an element of an electrified drivetrain, wherein the applied braking force is a reactive torque from the electric device that is part of a regenerative braking event.

In one embodiment, the vehicle 10 includes an operator brake pedal 40, which is disposed in a passenger compartment of the vehicle 10 and employed by a vehicle operator to generate a braking command. A pedal position sensor 42 is disposed to monitor operator input to the brake pedal 40. Alternatively or in addition, the braking controller 50 may be configured to generate a braking command that can be communicated to the master cylinder 32 and/or the brake actuator 36 to autonomously command actuation of the braking system 30 to effect vehicle braking in response to sensed conditions. The autonomously commanded braking command can be separate from or in conjunction with the braking command that is generated by the operator.

The vehicle 10 may be equipped with a spatial monitoring system 54 that is disposed to monitor the spatial environment surrounding the vehicle 10. The vehicle 10 may be equipped with a Global Positioning System (GPS) 52 for navigation. The vehicle 10 may be equipped with a telematics device 56 to effect extra-vehicle communication. The vehicle 10 may be equipped with a Human-Machine Interface (HMI) device 70 to effect communication with the vehicle operator. Communication between the various controllers may be accomplished with a communication link 75.

The braking system 30 is configured to control vehicle braking, and includes wheel brake devices, e.g., disc-brake elements, calipers, master cylinders, and a braking actuator, e.g., a pedal. Wheel speed sensors monitor individual wheel speeds, and the braking controller 50 can be mechanized to include anti-lock braking control functionality. The braking controller 50 may also coordinate braking effort generated via the wheel brakes and regenerative braking effort generated via the electric motor(s) during a braking event. The braking system 30 further includes numerous other components and subsystems that can transfer braking commands and monitor braking performance, each of which may be subject to wear and deterioration during their service life.

The spatial monitoring system 54 can include a controller and one or a plurality of spatial sensors 55, wherein each of the spatial sensors 55 is disposed on-vehicle to monitor a field of view of objects and geographic regions that are proximal to the vehicle 10. The spatial monitoring system 54 generates digital representations of each of the fields of view including proximate remote objects based upon data inputs from the spatial sensors. The spatial monitoring system 54 can evaluate inputs from the spatial sensors 55 to determine a linear range, relative speed, and trajectory of the vehicle 10 in view of each proximate remote object. The remote objects can include a predefined locus point, such as an intersection, a cross-walk, a stop sign at an intersection, etc. The spatial sensors 55 can be located at various locations on the vehicle 10, including the front corners, rear corners, rear sides and mid-sides. The spatial sensors 55 can include a front radar sensor and a camera in one embodiment, although the disclosure is not so limited. Placement of the aforementioned spatial sensors 55 permits the spatial monitoring system 54 to monitor traffic flow including proximate vehicles and other objects around the vehicle 10. Data generated by the spatial monitoring system 54 may be employed by a lane mark detection processor (not shown) to estimate the roadway. The spatial sensors 55 can further include object-locating sensing devices including range sensors, such as FM-CW (Frequency Modulated Continuous Wave) radars, pulse and FSK (Frequency Shift Keying) radars, and lidar (Light Detection and Ranging) devices, and ultrasonic devices which rely upon effects such as Doppler-effect measurements to locate forward objects. The possible object-locating devices include charged-coupled devices (CCD) or complementary metal oxide semi-conductor (CMOS) video image sensors, and other known camera/video image processors which utilize digital photographic methods to 'view' forward objects including one or more vehicle(s). Such sensing systems are employed for detecting and locating objects in automotive applications and are useable with systems including, e.g., adaptive cruise control, autonomous braking, autonomous steering and side-object detection.

The spatial monitoring system 54 can be further configured to monitor vehicle position, vehicle dynamic states and the spatial environment proximal to the vehicle 10. This includes monitoring and characterizing the spatial environment proximal to the vehicle 10, which is provided to the autonomous controller 60 to provide a level of driving automation. Data and signal inputs include spatial environment data in the form of inputs from the spatial sensor(s) 55 and map data in the form of a detailed 3D map of the surrounding environment and position data from the GPS 52. Data inputs further include vehicle dynamic data in the form of data collected from in-vehicle sensors such as gyros and wheel speed sensors and information communicated from other vehicles, e.g., V2V data, and information communicated from the infrastructure, e.g., V2X data. The collected data from the spatial sensor(s) 55 is employed in localization, object detection, and classification algorithms to estimate the position of the current road, the current traffic lane, the types and position of objects and obstacles, including both static and dynamic obstacles and objects to estimate motion and behavior of surrounding moving obstacles on the road and on the traffic lane. The spatial monitoring system 54 can monitor and estimate vehicle position and dynamic states, as described herein. The vehicle position states include geographically defined x- and y-states (e.g., latitude and longitude), and an angular heading. The vehicle dynamic states include yaw, lateral acceleration and longitudinal acceleration states.

The spatial sensors 55 associated with the vehicle spatial monitoring system 54 are preferably positioned within the vehicle 10 in relatively unobstructed positions to monitor the spatial environment. As employed herein, the spatial environment includes external elements, including fixed objects such as signs, poles, trees, houses, stores, bridges, etc., and moving or moveable objects such as pedestrians and other vehicles. Each of these spatial sensors 55 provides an estimate of actual location or condition of an object, wherein said estimate includes an estimated position and standard deviation. As such, sensory detection and measurement of object locations and conditions are typically referred to as 'estimates.' It is further appreciated that the characteristics of these spatial sensors 55 are complementary, in that some are more reliable in estimating certain parameters than others. The spatial sensors 55 can have different operating ranges and angular coverages capable of estimating different parameters within their operating ranges. For example, radar sensors may be employed to estimate range, range rate and azimuth location of an object. A camera with a vision processor may be employed in estimating a shape and azimuth position of the object, but is less efficient at estimating the range and range rate of an object. Scanning type lidar sensors may be employed in estimating range and azimuth position. Ultrasonic sensors may be employed in estimating range. Further, it is appreciated that the performance of each sensor technology is affected by differing environmental conditions. Thus, some of the spatial sensors 55 present parametric variances during operation, although overlapping coverage areas of the sensors create opportunities for sensor data fusion.

The autonomous controller 60 is configured to effect autonomous vehicle operation. Autonomous vehicle functionality may include an on-vehicle control system that is capable of providing a level of driving automation. The terms 'driver' and 'operator' describe the person responsible for directing operation of the vehicle 10, whether actively involved in controlling one or more vehicle functions or directing autonomous vehicle operation. Driving automation can include a range of dynamic driving and vehicle operation. Driving automation can include some level of automatic control or intervention related to a single vehicle function, such as steering, acceleration, and/or braking, with the driver continuously having overall control of the vehicle 10. Driving automation can include some level of automatic control or intervention related to simultaneous control of multiple vehicle functions, such as steering, acceleration, and/or braking, with the driver continuously having overall control of the vehicle 10. Driving automation can include simultaneous automatic control of all vehicle driving functions, including steering, acceleration, and braking, wherein the driver cedes control of the vehicle for a period of time during a trip. Driving automation can include simultaneous automatic control of vehicle driving functions, including steering, acceleration, and braking, wherein the driver cedes control of the vehicle 10 for an entire trip. Driving automation includes hardware and controllers configured to monitor the spatial environment under various driving modes to perform various driving tasks during dynamic vehicle operation. Driving automation can include, by way of non-limiting examples, cruise control, adaptive cruise control, lane-change warning, intervention and control, automatic parking, acceleration, braking, and the like. The autonomous vehicle functions include, by way of non-limiting examples, an adaptive cruise control (ACC) operation, lane guidance and lane keeping operation, lane change operation, steering assist operation, object avoidance operation, parking assistance operation, vehicle braking operation, vehicle speed and acceleration operation, vehicle lateral motion operation, e.g., as part of the lane guidance, lane keeping and lane change operations, etc. As such, the braking command can be generated by the autonomous controller 60 independently from an action by the vehicle operator and in response to an autonomous control function.

Operator controls can be included in the passenger compartment of the vehicle 10 and may include, by way of non-limiting examples, a steering wheel, an accelerator pedal, the brake pedal 40 and an operator input device that is an element of the HMI device 70. The operator controls enable a vehicle operator to interact with and direct operation of the vehicle 10 in functioning to provide passenger transportation. The operator control devices including the steering wheel, accelerator pedal, brake pedal 40, transmission range selector and the like may be omitted in some embodiments of the vehicle 10.

The HMI device 70 provides for human/machine interaction, for purposes of directing operation of an infotainment system, the GPS 52, a navigation system and the like, and includes a controller. The HMI device 70 monitors operator requests and provides information to the operator including status of vehicle systems, service and maintenance information. The HMI device 70 communicates with and/or controls operation of a plurality of operator interface devices, wherein the operator interface devices are capable of transmitting a message associated with operation of one of the autonomic vehicle control systems. The HMI device 70 may also communicate with one or more devices that monitor biometric data associated with the vehicle operator, including, e.g., eye gaze location, posture, and head position tracking, among others. The HMI device 70 is depicted as a unitary device for ease of description, but may be configured as a plurality of controllers and associated sensing devices in an embodiment of the system described herein. Operator interface devices can include devices that are capable of transmitting a message urging operator action, and can include an electronic visual display module, e.g., a liquid crystal display (LCD) device, a heads-up display (HUD), an audio feedback device, a wearable device and a haptic seat. The operator interface devices that are capable of urging operator action are preferably controlled by or through the HMI device 70. The HUD may project information that is reflected onto an interior side of a windshield of the vehicle, in the field of view of the operator, including transmitting a confidence level associated with operating one of the autonomic vehicle control systems. The HUD may also provide augmented reality information, such as lane location, vehicle path, directional and/or navigational information, and the like.

In one embodiment, the vehicle 10 can be configured to communicate with an extra-vehicle communication network 85 via the telematics device 56, which includes communicating between a controller associated with an intelligent highway system and the vehicle 10. An intelligent highway system can be configured to monitor locations, speeds and trajectories of a plurality of vehicles, with such information employed to facilitate control of one or a plurality of similarly-situated vehicles. This can include communicating geographic location, forward velocity and acceleration rate of one or more vehicles in relation to the vehicle 10. In one embodiment, the vehicle 10 is configured to communicate with an off-board controller 80, such as at a remote service center that employs an off-board administrator, via the communication network 85.

The term "controller" and related terms such as control module, module, control, control unit, processor and similar terms refer to one or various combinations of Application Specific Integrated Circuit(s) (ASIC), electronic circuit(s), central processing unit(s), e.g., microprocessor(s) and associated non-transitory memory component(s) in the form of memory and storage devices (read only, programmable read only, random access, hard drive, etc.). The non-transitory memory component is capable of storing machine-readable instructions in the form of one or more software or firmware programs or routines, combinational logic circuit(s), input/output circuit(s) and devices, signal conditioning and buffer circuitry and other components that can be accessed by one or more processors to provide a described functionality. Input/output circuit(s) and devices include analog/digital converters and related devices that monitor inputs from sensors, with such inputs monitored at a preset sampling frequency or in response to a triggering event. Software, firmware, programs, instructions, control routines, code, algorithms and similar terms mean controller-executable instruction sets including calibrations and lookup tables. Each controller executes control routine(s) to provide desired functions. Routines may be executed at regular intervals, for example each 100 microseconds during ongoing operation. Alternatively, routines may be executed in response to occurrence of a triggering event. The term 'model' refers to a processor-based or processor-executable code and associated calibration that simulates a physical existence of a device or a physical process. The terms 'dynamic' and 'dynamically' describe steps or processes that are executed in real-time and are characterized by monitoring or otherwise determining states of parameters and regularly or periodically updating the states of the parameters during execution of a routine or between iterations of execution of the routine. The terms "calibration", "calibrate", and related terms refer to a result or a process that compares an actual or standard measurement associated with a device with a perceived or observed measurement or a commanded position. A calibration as described herein can be reduced to a storable parametric table, a plurality of executable equations or another suitable form.

Communication between controllers, and communication between controllers, actuators and/or sensors may be accomplished using the communication link 75, which may be a direct-wired point-to-point link, a networked communication bus link, a wireless link or another communication link. Communication includes exchanging data signals, including, for example, exchanging electrical signals via a conductive medium, electromagnetic signals via air, optical signals via optical waveguides, and the like. The data signals may include discrete, analog or digitized analog signals representing inputs from sensors, actuator commands, and communication between controllers. The term "signal" refers to a physically discernible indicator that conveys information, and may be a suitable waveform (e.g., electrical, optical, magnetic, mechanical or electromagnetic), such as DC, AC, sinusoidal-wave, triangular-wave, square-wave, vibration, and the like, that is capable of traveling through a medium. A parameter is defined as a measurable quantity that represents a physical property of a device or other element that is discernible using one or more sensors and/or a physical model. A parameter can have a discrete value, e.g., either "1" or "0", or can be infinitely variable in value.

The telematics device 56 includes a wireless telematics communication system capable of extra-vehicle communications, including communicating with the communication network 85 having wireless and wired communication capabilities. The telematics device 56 is capable of extra-vehicle communications that includes short-range vehicle-to-vehicle (V2V) communication. Alternatively or in addition, the telematics device 56 has a wireless telematics communication system capable of short-range wireless communication to a handheld device, e.g., a cell phone, a satellite phone or another telephonic device. In one embodiment the handheld device is loaded with a software application that includes a wireless protocol to communicate with the telematics device 56, and the handheld device executes the extra-vehicle communication, including communicating with the off-board administrator via the off-board controller 80 via the communication network 85. Alternatively or in addition, the telematics device 56 executes the extra-vehicle communication directly by communicating with the off-board controller via a communication network.

Various components, subsystems and systems may experience different rates of deterioration and aging over the service life of a vehicle, and may benefit from being managed and controlled in a way that imparts less stress under certain conditions to extend their service life and/or maintain an acceptable vehicle performance level. Elements of brakes, e.g., brake pads, are serviceable parts that undergo wear in-use, and periodically need to be replaced to maintain braking performance. Proactive and early detection of brake wear and degraded performance can be provided to a driver and autonomous control routines. In autonomous brake control systems, the magnitude of applied braking force may be determined based upon a relative speed and a relative distance in relation to a target, which can be an intersection in one embodiment.

Figure 2:
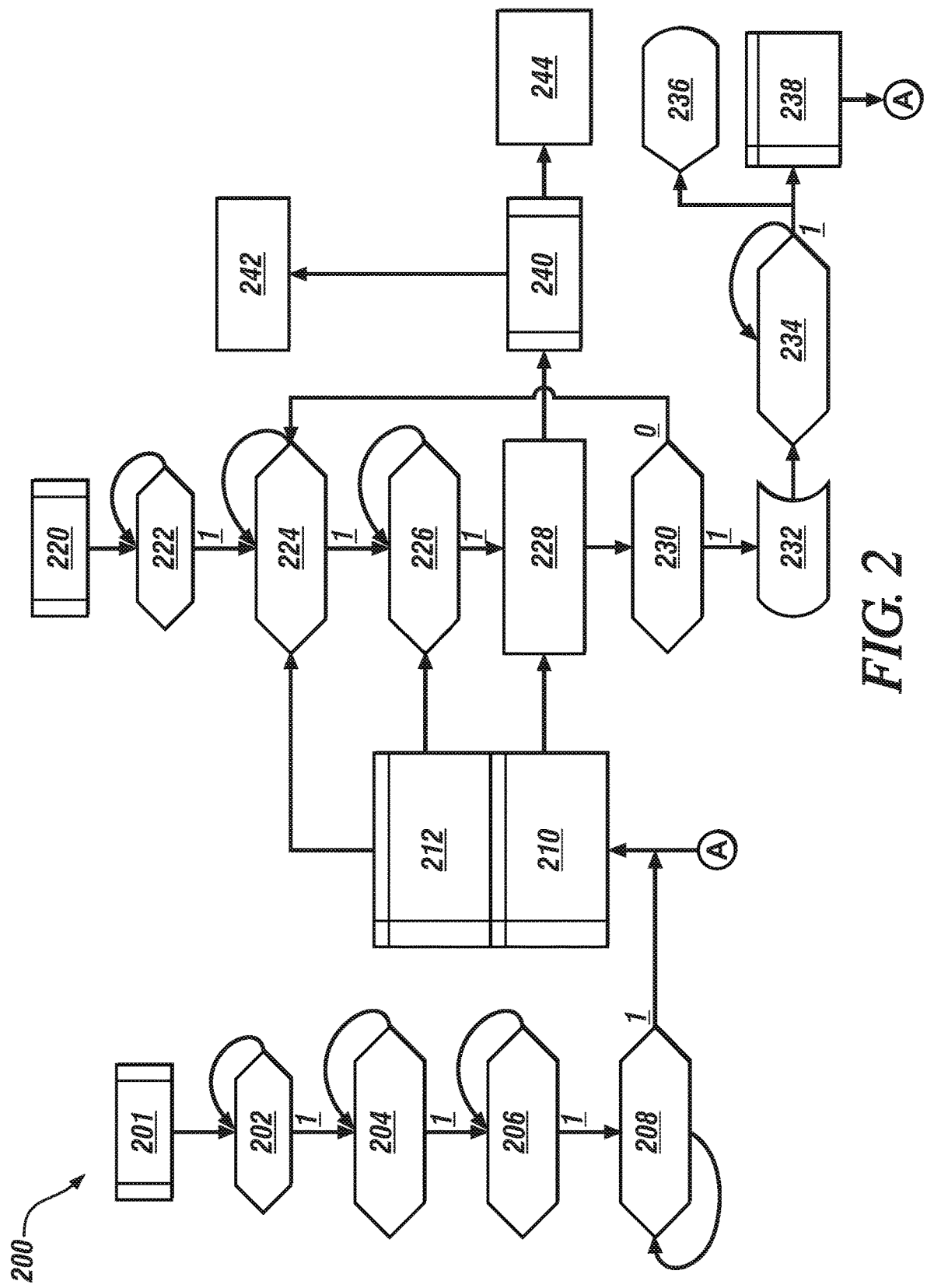
FIG. 2 schematically shows an information flow diagram for a braking monitoring routine associated with operation of the vehicle that is described with reference to FIG. 1, in accordance with the disclosure.

FIG. 2 schematically shows an information flow diagram associated with a braking monitoring routine 200, which can be advantageously implemented in a controller of an embodiment of the vehicle 10 that is described with reference to FIG. 1. The braking monitoring routine 200 can be executed as one or a plurality of control routines. Overall, the braking monitoring routine 200 includes detecting occurrence of a braking event and monitoring applied braking force during the braking event. Monitoring the applied braking force can be achieved via the pressure sensor 38 that is disposed to monitor the hydraulic pressure and the associated applied braking pressure in the master cylinder 32 during the braking event, in one embodiment. A total stopping distance and a time to stop the vehicle 10 during the braking event are also monitored. The time to stop is measured from a beginning point, which is when the braking event is commanded, and an end point, which is when the vehicle 10 has achieved a zero speed state. The applied braking pressure is integrated over the time to stop. The braking system is evaluated based upon the total stopping distance and the integrated applied braking force during the braking event. A need to service the braking system can be determined based upon the evaluation of the total stopping distance and the integrated applied braking force during the braking event. Vehicle stopping distance can vary depending on the brake wear. The braking monitoring routine 200 compares stopping distance and time to stop values to a calibrated stopping distance and time to stop values in conjunction with comparing the braking force with a calibrated braking force, utilizing existing brake hardware and without adding sensors or other devices that are specifically configured to detect brake wear.

Table 1 is provided as a key wherein the numerically labeled blocks and the corresponding functions are set forth as follows, corresponding to the braking monitoring routine 200. The teachings may be described herein in terms of functional and/or logical block components and/or various processing steps. It should be realized that such block components may be composed of hardware, software, and/or firmware components that have been configured to perform the specified functions.

TABLE 1

| BLOCK | BLOCK CONTENTS |
|---|---|
| 201 | Vehicle calibration |
| 202 | Is vehicle operating? |
| 204 | Is vehicle in Drive, and is vehicle speed greater than a minimum threshold? |
| 206 | Is braking commanded? |
| 208 | Is there a predefined locus point associated with a hard stop? |
| 210 | Capture information related to calibration stopping event, including initial vehicle speed, cumulative braking force (e.g., pressure), stopping distance |
| 212 | Calibrate on-vehicle map, stopping distance |
| 220 | Vehicle operation |
| 222 | Is vehicle operating? |
| 224 | Detect vehicle location; Is location on map = calibrated map? |
| 226 | Detect and monitor stop event (stopping distance, applied braking pressure, distance); Is stop = calibrated stop? |
| 228 | Compare stopping distance, accumulated braking pressure for distance |
| 230 | Is difference greater than threshold? |
| 232 | Increment event counter |
| 234 | Frequency of events greater than maximum threshold? |
| 236 | Issue notice to operator |
| 238 | Update calibrated time to stop |
| 240 | Execute diagnosis/prognosis routine |
| 242 | Execute fault isolation routine |
| 244 | Execute SOH monitoring of braking system |

The braking monitoring routine 200 includes a vehicle calibration subroutine 201 and a vehicle operation subroutine 220. A braking event is any event during vehicle operation in which vehicle braking is commanded, either by an operator or by an autonomous control system. A stopping event is a braking event that results in the vehicle 10 achieving a stop condition, i.e., reaching zero speed. The designation of (1) indicates that the described condition is TRUE, or achieved, and the designation of (0) indicates that the described condition is FALSE, or not achieved. The vehicle calibration subroutine 201 includes verifying that the vehicle is operating (202)(1), verifying that the vehicle is operating in a forward gear and that the vehicle speed is greater than a minimum threshold speed (204)(1), verifying the presence of a braking command (206)(1), and verifying the presence of a predefined locus point, such as a stop sign, a crosswalk, a traffic lamp at an intersection or other related stop event (208)(1). When all the aforementioned conditions are achieved, data associated with the calibration stopping event is captured in an on-board memory device and formed into a database (210), including an initial vehicle speed, cumulative braking force, e.g., pressure, a time to stop and stopping distance. Preferably, the stopping distance is determined employing information from the spatial sensors 55 of the spatial monitoring system 54, e.g., the lidar sensors that estimate linear range and azimuth position. Location of the vehicle 10 as indicated by the GPS 52 may also be captured, and a target stopping distance can be associated with an on-vehicle map for the GPS location (212). The result from the vehicle calibration subroutine 201 can be in the form of a lookup table that is stored in a memory array in the controller, and include, for the location indicated by the on-vehicle map, a braking force required to achieve a stopping distance and/or a time to stop that is related to an initial vehicle speed. Such information is captured in an on-vehicle controller, or alternatively, in an off-vehicle controller for reference during subsequent stopping events. The vehicle calibration subroutine 201 described herein is one embodiment of a method for calibrating an embodiment of the vehicle 10 to determine a vehicle-specific empirical relationship between vehicle speed, cumulative applied braking force, time to stop, and stopping distance. As described with reference to the vehicle operation subroutine 220, additional vehicle data in the form of initial vehicle speeds, cumulative braking forces, e.g., pressure, times to stop and stopping distances can be captured and incorporated into the database in order to cover braking events over a broad range of braking situations, weather conditions and brake temperatures. These additional elements may also be incorporated into the database, including employing normalization models that take such factors into account in determining the relationship between vehicle speed, cumulative applied braking force, time to stop, and stopping distance.

Operation of the vehicle operation subroutine 220 executes as follows. When the vehicle is operating (222)(1), the GPS 52 verifies that the vehicle 10 is operating in a location that has been calibrated (224)(1), and determines whether the vehicle 10 executes a stopping event, including a stopping event having conditions that are related to one of the calibrated stopping events of the vehicle calibration subroutine 201 (226)(1). This includes capturing data associated with the present stopping event, including an initial vehicle speed, cumulative braking pressure, time to stop and stopping distance. The captured data associated with the present stopping event is compared with calibration data for the stopping event (228), and forwarded to a diagnostic/prognostic routine (240) for evaluation.

The diagnostic/prognostic routine (240) includes a state of health (SOH) monitoring step 242 and a fault isolation step 244. The terms "prognostic", "prognosis", and related terms are associated with data monitoring and algorithms and evaluations that render an advance indication of a likely future event associated with a component, a subsystem, or a system, such as the braking system 30 of the vehicle 10. Prognostics can include classifications that include a first state that indicates that the component, subsystem, or system is operating in accordance with its specification ("Green" or "G"), a second state that indicates deterioration in the operation of the component, subsystem, or system ("Yellow" or "Y"), and a third state that indicates a change or a fault in the operation of the component, subsystem, or system ("Red" or "R") that requires immediate attention by the operator. The terms "diagnostics", "diagnosis" and related terms are associated with data monitoring and algorithms and evaluations that render an indication of presence or absence of a specific fault with a component, subsystem or system. The term "mitigation" and related terms are associated with operations, actions or control routines that operate to lessen the effect of a fault in a component, subsystem or system.

The SOH monitoring step 242 includes a determination of the SOH of the braking system 30, wherein the SOH is determined based upon evaluation and correlation of the data associated with the stopping events, including the initial vehicle speed, cumulative braking pressure, the time to stop and stopping distance. Green status may be assigned to a stopping distance and/or a time to stop that is less than a first threshold for an initial vehicle speed, and Yellow status may be assigned to a stopping distance and/or a time to stop that is greater than the first threshold for an initial vehicle speed, and less than a second threshold for the initial vehicle speed. Red status may be assigned to a stopping distance and/or a time to stop that is greater than the second threshold for the initial vehicle speed. The braking monitoring routine 200 may send a message to the vehicle operator via the HMI device 70 or an off-board administrator to arrange brake service when the SOH of the braking system 30 is Yellow and the vehicle 10 is configured as an autonomous vehicle. The braking monitoring routine 200 may be capable of commanding an intervention, such as restricted operation or vehicle disablement when the SOH of the braking system 30 is Red.

The fault isolation step 244 includes evaluation steps to isolate a fault to an element in the braking system 30 based upon the data associated with the stopping events, including the initial vehicle speed, cumulative braking pressure, time to stop and stopping distance. In one embodiment, a fault may be isolated to a worn brake pad when the stopping distance is greater than a first threshold stopping distance that is associated with an initial vehicle speed. In one embodiment, a fault may be isolated to a sticky brake caliper when the stopping distance is less than a second threshold stopping distance that is associated with an initial vehicle speed. Other fault isolation routines can be developed and implemented to isolate faults in other components or subsystems of the braking system 30 with the data associated with the stopping events, including the initial vehicle speed, cumulative braking pressure, time to stop and stopping distance.

A difference is calculated between the stopping distance for the stopping event and one of the calibrated stopping events of the vehicle calibration subroutine 201, and an absolute value for the difference is compared to a threshold (230).

When the absolute value for the difference in the stopping distances is less than the threshold (230)(0), this iteration ends, and the routine 200 returns to step 224 to await an indication from the GPS 52 that the vehicle 10 is operating in a location that has been calibrated, and the process steps repeat.

When the absolute value for the difference in the stopping distances is greater than the threshold (230)(1), an event counter is incremented (232), and the event counter is compared to a maximum threshold (234). When the maximum threshold is exceeded (234)(1), the result is communicated to the vehicle operator or administrator (236) and a value for the calibrated time to stop associated with the stopping event is updated (238). The updated time to stop for the stopping event is provided as input to update the data associated with the calibration stopping event as captured in step 210.

One method for evaluating wear or system degradation of the braking system 30 includes determining a mean deceleration rate based upon the total stopping distance and the total time to stop, and evaluating the braking system 30 based upon a relation between the integrated applied braking force and the mean deceleration rate. A decrease in the mean deceleration rate for a known value of the integrated applied braking force may indicate increased wear or a decrease in the SOH.

In this manner, monitoring of the initial vehicle speed, cumulative braking pressure, time to stop and stopping distance, and a comparison to previously captured data can be employed to monitor brake performance to detect brake wear. Other factors, e.g., weather and ambient conditions, road surface conditions, etc. may interfere with or otherwise affect results. Furthermore, electric power generation as a result of regenerative braking may be reviewed to determine the magnitude of braking force, and thus can be monitored. As such, the system can advantageously employ historical data to sense a change degradation in braking performance and then changes the system inputs in response to maintain braking performance. When braking performance degrades below a threshold, the vehicle operator and/or autonomous controller 60 is informed that there is a need for maintenance and service, including a portion of the braking system likely needing service. The autonomous controller 60 may communicate the SOH of braking system 30 to the off-board administrator via the telematics device 56.

The flowchart and block diagrams in the flow diagrams illustrate the architecture, functionality, and operation of possible implementations of systems, methods, and computer program products according to various embodiments of the present disclosure. In this regard, each block in the flowchart or block diagrams may represent a module, segment, or portion of code, which includes one or more executable instructions for implementing the specified logical function(s). It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions. These computer program instructions may also be stored in a computer-readable medium that can direct a controller or other programmable data processing apparatus to function in a particular manner, such that the instructions stored in the computer-readable medium produce an article of manufacture including instructions to implement the function/act specified in the flowchart and/or block diagram block or blocks.

The detailed description and the drawings or figures are supportive and descriptive of the present teachings, but the scope of the present teachings is defined solely by the claims. While some of the best modes and other embodiments for carrying out the present teachings have been described in detail, various alternative designs and embodiments exist for practicing the present teachings defined in the appended claims.

What is claimed is:

1. A method for monitoring a braking system for a vehicle, the method comprising:
   detecting a braking event;
   determining an applied braking force during the braking event;
   integrating the applied braking force during the braking event;
   monitoring, via a sensor, a total stopping distance during the braking event and a time to stop;
   evaluating, via a controller, the braking system based upon the total stopping distance, the time to stop and the integrated applied braking force during the braking event;
   determining a fault associated with the braking system based upon the evaluation of the braking system; and
   communicating, via the controller, the fault associated with the braking system.

2. The method of claim 1, further comprising:
   determining a state of health (SOH) for the braking system based upon the evaluation of the total stopping distance, the time to stop and the integrated applied braking force during the braking event; and communicating, via a human-machine interface device, the SOH for the braking system to a vehicle operator when the SOH is less than a threshold SOH.

3. The method of claim 1, further comprising:
determining a state of health (SOH) for the braking system based upon the evaluation of the total stopping distance, the time to stop and the integrated applied braking force during the braking event; and
communicating, via a telematics device, the SOH for the braking system to an off-board controller when the SOH is less than a threshold SOH.

4. The method of claim 1, further comprising determining an adjustment to the applied braking force during a subsequent braking event based upon the total stopping distance and the integrated applied braking force during the braking event.

5. The method of claim 1, further comprising:
determining an initial vehicle speed at initiation of the braking event; and
evaluating, via the controller, the braking system based upon the initial vehicle speed, the total stopping distance and the integrated applied braking force during the braking event.

6. The method of claim 1, wherein the on-vehicle sensor monitoring the total stopping distance during the braking event comprises a lidar device.

7. The method of claim 1, wherein determining the applied braking force during the braking event comprises monitoring, via a pressure sensor, hydraulic braking pressure in a master cylinder of the braking system.

8. The method of claim 1, further comprising communicating, via a telematics device, a need to service the braking system to an off-board controller based upon the fault associated with the braking system.

9. The method of claim 1, wherein evaluating the braking system based upon the total stopping distance, the time to stop and the integrated applied braking force during the braking event comprises:
determining an initial vehicle speed at initiation of the braking event;
determining a mean deceleration rate based upon the initial vehicle speed, the total stopping distance and the time to stop; and
evaluating the braking system based upon a relation between the integrated applied braking force and the mean deceleration rate.

10. A vehicle, comprising:
a braking system configured to apply a braking force to a wheel in response to a braking command;
a first sensor disposed to monitor a parameter associated with the braking force;
a spatial monitoring system including a spatial sensor, wherein the spatial sensor is disposed to determine a linear range between the vehicle and a predefined locus point;
a first controller, operatively connected to the braking system and in communication with the first sensor and the spatial monitoring system, the first controller including an instruction set, the instruction set executable to:
detect a braking command for a braking event,
monitor the braking force applied to the wheel during the braking event and a time to stop,
determine a total vehicle stopping distance for the braking event;

evaluate the braking system based upon the total vehicle stopping distance, the time to stop and the braking force that is applied during the braking event, and
determine a need to service the braking system based upon the evaluation of the braking system, including the total vehicle stopping distance, the time to stop and the braking force applied during the braking event.

11. The vehicle of claim 10, wherein the braking command is generated by a vehicle operator.

12. The vehicle of claim 10, further comprising:
an autonomous controller configured to monitor the braking system and in communication with the first controller,
wherein the braking command is generated by the autonomous controller in response to input from the spatial sensor.

13. The vehicle of claim 10, wherein the spatial sensor comprises one of a lidar sensor, a radar device and an ultrasonic device.

14. The vehicle of claim 10, wherein the spatial monitoring system includes a global positioning system.

15. The vehicle of claim 10,
wherein the braking system includes a pressure actuation cylinder,
wherein the first sensor comprises a pressure sensor is disposed to the pressure actuation cylinder; and
wherein the instruction executable to determine the braking force applied during the braking event comprises the instruction set executable to monitor, via the pressure sensor, hydraulic braking pressure in the pressure actuation cylinder of the braking system.

16. The vehicle of claim 10,
wherein the braking system includes a master cylinder, and
wherein the first sensor comprises a pressure sensor disposed to monitor hydraulic pressure in the master cylinder; and
wherein the instruction executable to determine the braking force applied during the braking event comprises the instruction set executable to monitor, via the pressure sensor, hydraulic braking pressure in the master cylinder of the braking system.

17. The vehicle of claim 10,
wherein the braking system includes an electrically-activated brake piston,
wherein the first sensor comprises a sensor disposed to monitor linear displacement of a plunger of the brake piston; and
wherein the instruction executable to determine the braking force applied during the braking event comprises the instruction set executable to monitor, via the sensor, the linear displacement of the plunger of the brake piston.

18. The vehicle of claim 10, further comprising a human-machine interface device in communication with the first controller, wherein the instruction set is executable to:
determine a state of health (SOH) for the braking system based upon the evaluation of the total stopping distance, the time to stop and the integrated applied braking force during the braking event; and
communicate, via the human-machine interface device, the SOH for the braking system to a vehicle operator when the SOH is less than a threshold SOH.

19. The vehicle of claim 10, further comprising a telematics device in communication with the first controller;

wherein the instruction set is executable to:
  determine a state of health (SOH) for the braking system based upon the evaluation of the total stopping distance, the time to stop and the integrated applied braking force during the braking event; and
  communicate, via the telematics device, the SOH for the braking system to an off-board controller when the SOH is less than a threshold SOH.

* * * * *